No. 673,911. Patented May 14, 1901.
B. G. LAMME.
POLYPHASE ALTERNATING CURRENT MOTOR.
(Application filed Jan. 30, 1899.)

(No Model.)

WITNESSES:

INVENTOR
Benjamin G. Lamme
BY
Kerley G. Carr
ATTORNEY.

United States Patent Office.

BENJAMIN G. LAMME, OF PITTSBURG, PENNSYLVANIA, ASSIGNOR TO THE WESTINGHOUSE ELECTRIC & MANUFACTURING COMPANY, OF PENNSYLVANIA.

POLYPHASE ALTERNATING-CURRENT MOTOR.

SPECIFICATION forming part of Letters Patent No. 673,911, dated May 14, 1901.

Application filed January 30, 1899. Serial No. 703,792. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Polyphase Alternating-Current Motors, (Case No. 805,) of which the following is a specification.

My invention relates to alternating-current motors; and it has for its object to provide a motor to be operated by a plurality of out-of-phase alternating currents and to provide means whereby the speed of such motor may be readily varied.

In polyphase motors heretofore designed and constructed out-of-phase currents have been supplied to the primary member of the motor in such manner as to produce a rotating field which acts by induction upon the secondary member in order to produce rotation of one of such members. It has also been proposed to supply the out-of-phase currents to both members of the motor in such a manner as to produce two rotating fields, the one in advance of the other, whereby mechanical rotation of the movable member of the motor is effected. My invention differs from each of these motors in that each member of the motor is supplied with current by a circuit or circuits the electromotive forces of which differ in phase from the electromotive forces of the circuit or circuits supplying current to the other member.

My invention has other features by virtue of which the speed of the motor may be readily and economically varied over a wide range. These features will be hereinafter more fully described.

On account of the great amount of self-induction in the field-magnet of such a motor, due to the character of the magnetizing-current, it is necessary or at least desirable that the magnetizable portion of the field-magnet structure be laminated throughout instead of having merely laminated cores mounted in cast iron or steel frames, as is usual in such machines.

Figure 1:
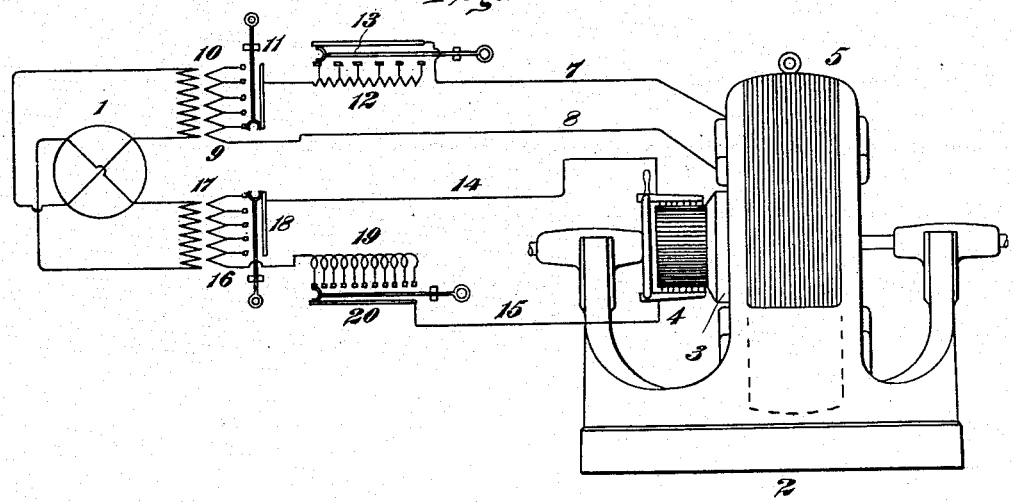
Figure 2:
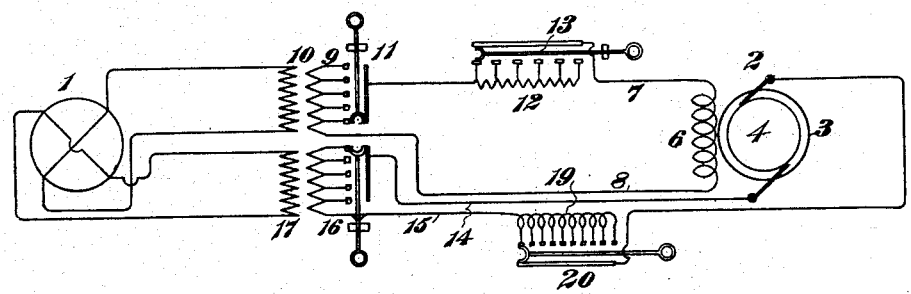

In the accompanying drawings, Figure 1 is a side elevation of a motor and a diagram of circuits constructed and arranged in accordance with my invention, and Fig. 2 is a diagram of the circuits of the entire system.

The details of construction as illustrated in the drawings are as follows:

1 is a generator of two-phase alternating currents, and 2 is a motor of the direct-current type, having a rotating armature 3, commutator 4, and field-magnet 5. The magnetizable portion of the field-magnet 5 is laminated throughout, as clearly shown in Fig. 1. The field-magnet winding 6 of the motor is supplied with current through the conductors 7 and 8 from the secondary 9 of a stationary transformer 10, the primary winding of this transformer being connected to the leads of the generator corresponding to one phase of current. The secondary 9 of the tranformer 10 is provided with a switching device 11 of any suitable construction for varying the active length of such transformer secondary in order to vary the electromotive force supplied to the field-magnet winding. I have also shown an ohmic or dead resistance 12 in the circuit 7 8, combined with a movable switch-arm 13, in order to cut more or less of this resistance into or out of circuit. The armature 3 of the motor is provided with current through conductors 14 and 15, connected with the secondary 16 of a stationary transformer 17, the primary of which is connected to the leads of the generator 1, corresponding to an electromotive force differing in phase from that supplied to the primary of the transformer 10 by approximately ninety degrees. This secondary 16 is also provided with a switching device 18, whereby the active length of the secondary may be varied in order to vary the electromotive force applied to the motor-armature. An inductive resistance 19 is included in the circuit 14 15 and a switching device 20 is provided in order to vary the amount of this inductive resistance included in circuit or cut it out altogether. Since the self-induction of the field-magnet of the motor will be very high as compared with that of the armature, the field-current and magnetism will lag very nearly ninety degrees behind the impressed electromotive force. This will serve to very nearly bring the field into the same phase with the armature-current and magnetism, since there is a difference of ninety degrees between the electromotive forces of the two external circuits.

In order to vary the speed of the motor, the electromotive force supplied to the armature may be varied by adjustment of the switching device 18 or both the field-magnet and armature electromotive force may be varied by adjusting both switching devices. The speed may also be varied, if desired, by adjusting the phase-angle between the currents in the two members of the motor, this being effected by adjusting either the ohmic resistance in the field-magnet circuit or the inductive resistance in the armature-circuit, or both.

All of the adjusting devices shown will probably not be used in practice in any one installation; but since all or any one of them may be utilized, if desired, to effect a variation in speed of the motor, I have shown all of them in the drawings.

It will be understood that my invention is not limited to the use of any specific mechanism for varying electromotive forces supplied to the motor and also that it is not limited to the employment of any number of such adjusting devices.

I desire it to be understood, further, that my invention is not limited to either a ninety-degree-phase difference between the supply-circuits or to two-phase circuits, though two-phase circuits in quadrature will probably be found more desirable in practice than any other.

I claim as my invention—

1. The combination with an electric motor of the direct-current type, of means for supplying alternating electromotive forces of one phase to the motor-armature, means for supplying the field-magnet winding with alternating electromotive forces which differ in phase from those supplied to the armature, means for varying at least one of said electromotive forces, and a variable resistance in series with the armature of the motor.

2. The combination with an electric motor of the direct-current type, of means for supplying alternating electromotive forces of one phase to the motor-armature, means for supplying electromotive forces of a different phase to the motor field-magnet and a variable resistance in series with each of the members of the motor for adjusting the phase relation of the currents due to said electromotive forces.

3. The combination with an electric motor of the direct-current type, of means for supplying electromotive forces of one phase to the armature of the motor, means for supplying electromotive forces of a different phase to the field-magnet of the motor, means for varying the electromotive force of at least one of the circuits, a non-inductive resistance in series with the field-magnet winding, an inductive resistance in series with the armature-winding and means for cutting more or less of each of said resistances out of circuit.

4. An alternating-current motor having a completely-laminated field-magnet and means for commuting the currents supplied to its armature, in combination with means for supplying independent alternating currents to the commutator and to the field-magnet winding, means for varying each of the applied electromotive forces, a variable inductive resistance in the armature-circuit and a variable non-inductive resistance in the field-magnet circuit.

In testimony whereof I have hereunto subscribed my name this 27th day of January, 1899.

BENJ. G. LAMME.

Witnesses:
 WESLEY G. CARR,
 H. C. TENER.